Patented July 27, 1943

2,325,339

UNITED STATES PATENT OFFICE 2,325,339

PURIFICATION OF CAUSTIC

Irving E. Muskat, Akron, Ohio, assignor to Pittsburgh Plate Glass Company, Allegheny County, Pa., a corporation of Pennsylvania No Drawing. Application March 25, 1940, Serial No. 325,790

16 Claims. (Cl. 23—184)

This invention relates to the purification of an aqueous solution of alkali metal hydroxide and to the recovery of purified sodium hydroxide from impure solutions thereof. Alkali metal hydroxides as initially produced are aqueous solutions, generally having a concentration of 8 to 12 percent by weight. These solutions are too dilute and too impure to be sold on the commercial market and accordingly, they must be subjected to purification and concentratoin.

The problem of purifying a sodium hydroxide solution prepared by electrolysis of a sodium chloride solution in a diaphragm type cell is particularly difficult. These solutions are substantially saturated with sodium chloride and in addition, contain sodium chlorate in objectionable amounts. Upon evaporation of these solutions to approximately 45 to 50 percent, a portion of the sodium chloride is precipitated and may be removed but such solutions remain substantially saturated as to this impurity. Thus, a solution of sodium hydroxide prepared by an electrolytic method contains sodium chloride and chlorate in such concentration that unless these impurities are removed or substantially reduced in concentration, the solutions are unfit for normal use and must be sold at a low price as a low-grade product.

Various methods have been proposed for the removal of these impurities but prior to applicant's invention, few if any, had been found satisfactory. Attempts have been made to purify this caustic by crystallizing out of solution certain solid caustic hydrates in a relatively pure form, separating the crystals from the mother liquor, and redissolving the crystals. Such processes have been found objectionable since they require cooling of the solution to 10° C. or below, and consequently, require considerable refrigeration which renders the process extremely expensive. In addition, the purification to be secured is not satisfactory for many purposes. Chlorate is not appreciably reduced by these crystallization processes. Moreover, since the caustic solutions are saturated with sodium chloride, this salt precipitates during cooling. Thus, since both sodium chloride and the caustic hydrates precipitate during the cooling of the solution, the resulting crystals are contaminated wtih the precipitated sodium chloride and a desirable degree of purification is not obtained.

The present invention affords a method whereby refrigeration of the solution and precipitation of sodium chloride during crystallization of caustic hydrates may be avoided. In accordance with my invention, I have found that upon addition of ammonia to an aqueous solution of sodium hydroxide which contains a substantial quantity of sodium chloride and/or chlorate, solid sodium hydroxide is precipitated without the concurrent precipitation of sodium chloride. The solid thus precipitated may be separated from the mother liquor and is found to contain substantially less chloride and chlorate than the solution from which it was precipitated. In general, this solid hydroxide contains more or less water and appears to be a hydrate of sodium hydroxide. If the temperature of the solution is maintained sufficiently high, for example, above 20° C., the solid precipitated is found to contain over 60 percent sodium hydroxide and in general, if the solid is separated from the mother liquor, to a sufficient degree, the composition of the solid corresponds closely to that of sodium hydroxide monohydrate. The exact composition of the solid is unknown and is exceedingly difficult to determine since it is generally contaminated with more or less mother liquor when it is removed, thus rendering accurate analysis exceedingly difficult. In view of the sodium hydroxide content, however, the solid is believed to be sodium hydroxide monohydrate.

Solids of other sodium hydroxide content may be precipitated by treatment of solutions at temperature below about 20° C. Thus, solid hydroxide which corresponds roughly to that of the dihydrate of sodium hydroxide may be precipitated in the presence of ammonia by cooling a solution containing about 45 to 52 percent sodium hydroxide to about 15° C. to 20° C. or below. In like manner, a solid corresponding in composition to the composition of the 3½ hydrate may be precipitated in the presence of ammonia from a solution containing about 39 percent of sodium hydroxide at a temperature below approximately 15° C. Substantially anhydrous caustic may be precipitated from a solution of 70 percent concentration or above at a temperature above about 60° C. In all cases the composition of the solid precipitated varies over a series of tests due apparently to the quantity of mother liquor which adheres to the solid when it is removed from the mixture. In any event it is found that upon recovery of the precipitated hydroxide a purified product is obtained. In addition, it is possible to conduct the crystallization with less refrigeration to secure higher yields than is possible with other crystallization processes.

When caustic liquors containing a large amount of sodium chloride are treated with ammonia, the precipitation of the solid hydroxide may be carried out in a manner such that a large portion of the sodium chloride remains in solution. This may be done, for example, by precipitating a solid corresponding to the dihydrate or the monohydrate under such conditions that the solubility of sodium chloride in the remaining mother liquor is sufficiently high to permit retention of at least a major portion of the sodium chloride in the original solution. For example, if 50 percent liquor saturated with sodium chloride were treated to precipitate one-half of the caustic as a solid which contains about 50 percent sodium hydroxide, it is evident that the remaining solution would be a 50 percent liquor and that one-half of the sodium chloride present must be precipitated. As the solubility of salt in caustic solutions rapidly increases with increasing dilution of the solution, it follows that if the mother liquor were more dilute it would be capable of keeping the major portion of the sodium chloride in solution. If a more dilute solution, for example, 44-48 percent is treated to precipate crystals analyzing approximately 50 percent NaOH or above, the mother liquor must, of necessity, be more dilute than the original liquor and because of its increased dilution and corresponding increased solubility for sodium chloride, the liquor will be made capable of dissolving the major portion of the total salt in the initial solution.

Accordingly, while it is desirable to precipitate a solid of approximately 50 percent concentration with ammonia, it is preferred to treat solutions somewhat below 50 percent concentration. Similarly, if the solution to be treated has a concentration of 50 percent and is saturated with sodium chloride, it may be advisable to dilute the solution before, during or after treatment with ammonia. This dilution step is not essential since more concentrated solid may be precipitated. For example, the monohydrate or equivalent solid may be precipitated from a solution containing about 40 to 50 percent or somewhat more sodium hydroxide whereby the solution becomes more and more dilute and capable of dissolving more sodium chloride as the solid is precipitated.

The amount of ammonia which may be used varies widely in accordance with the concentration of the solution being treated, the temperature, hydrate desired, etc., but the ammonia concentration is preferably maintained at such a value that co-existence of an appreciable ammonia liquor phase from a liquid caustic phase does not occur. In general, this ammonia concentration will be less than that required to cause the separation of the two liquid phases. However, if large excesses of ammonia, for example, 10 to 15 parts or more per part of NaOH are added, the two liquid phases disappear and solid of high concentration precipitates. Thus, it may be desirable to use a large excess of ammonia in excess of the amount at which liquid phase separation occurs. While a very effective purification may be obtained by addition of ammonia in such concentration that the solid hydrate is precipitated in the presence of two liquid phases, this phase of my invention is described and claimed in my copending application Serial No. 179,335, filed December 11, 1937, now Patent No. 2,196,595, issued April 9, 1940. In treating 50 percent liquor, the ammonia may be added in the form of a gas or liquid and maintained in the system by means of some super-atmospheric pressure.

In accordance with a further modification, I have found that caustic may be effectively purified by first treating with sufficient ammonia to cause separation of a pair of liquid phases and thereafter cooling the mixture to a suitable temperature, for example, below 35° C., to cause disappearance of the liquid phases and formation of solid hydroxide of high concentration in equilibrium with a single liquid phase. This method is particularly desirable in treating solutions having a concentration of 39 percent and above, since in treating such solutions with a large amount of ammonia at room temperature, caustic often precipitates in large lumps which, when removed, contain so much impure mother liquor that the product obtained is not sufficiently purified for many purposes. In accordance with the present modification, however, this difficulty is eliminated. In a similar manner, this precipitation may be secured by introduction of a large quantity of ammonia to cause disappearance of the two phases.

The concentration of the hydroxide solution will be dependent to a large extent upon the hydrate desired. For example, a 44 to 50 percent solution, when treated with gaseous ammonia, precipitates a solid product corresponding to the dihydrate at a temperature of below about 15 to 20° C. Obviously, if the 3½ hydrate were desired, the concentration would have to be kept somewhat below this concentration (usually at or below a concentration of 39 percent). The hydroxide which corresponds to that of monohydrate may be precipitated from solutions containing as little as 15 percent and as much as 70 percent NaOH with ammonia at a temperature of 20 to 25° C or above. Generally speaking, the range of concentration required to produce any desired hydrate is permissible of a fairly wide variation, being dependent primarily upon the quantity of ammonia used and the temperature. Very often, I prefer to prepare a solution of a concentration within 5 to 10 percent of the concentration of the solid to be precipitated and then treat with ammonia. It must be kept in mind, however, that the addition of ammonia tends to reduce the solubility of the hydroxide and its hydrates and for this reason, the prepared solution may have a concentration somewhat below the concentration of the hydrate to be crystallized.

While solutions of varying concentration may be treated in accordance with the present invention, it is found preferable to treat solutions containing not substantially less than 39 percent NaOH in order to avoid the use of an excessive quantity of ammonia. More dilute solutions may be treated, but a substantially greater amount of ammonia is required to precipitate solid hydroxide than for more concentrated solutions. The following table illustrates the amount of ammonia required to cause precipitation of solid hydroxide from sodium hydroxide solutions of different concentration at a temperature of approximately 30° C.

| Conc. of NaOH solution, per cent | Grams of $NH_3$ per gram of solution to cause crystallization | Grams of $NH_3$ per gram of NaOH in solution to cause crystallization |
|---|---|---|
| 16.7 | 1.5 | 9.2 |
| 20.0 | 1.3 | 6.6 |
| 30.0 | 0.80 | 2.7 |
| 40.0 | 0.33 | 0.84 |
| 50.4 | 0.04 | 0.09 |

In most cases it is found desirable to concentrate the solution up to 40 to 50 percent concentration and to remove precipitated impurities. Thereafter the treated solution may be treated with ammonia in accordance with the present invention.

The composition of the solid may be controlled to a degree by the temperature of treatment since by maintaining the temperature substantially above the melting point of a hydrate tends to prevent precipitation of such hydrate. Thus, cooling of the solution may be necessary to obtain a substantial precipitation of a hydrate such as dihydrate or 3½ hydrate. Generally speaking, cooling to below 20° C. is found desirable if a hydrate other than monohydrate is desired. In general, it is desirable to cool slowly in order that well-defined crystals are formed, but other cooling methods may be resorted to. The solution may be cooled before, during or after treatment with ammonia. Treatment above 20° C. generally results in precipitation of a solid corresponding in composition to that of the monohydrate but if the temperature is above about 60° C. substaintially anhydrous hydroxide may be precipitated.

Any convenient method of introducing the ammonia may be used. For example, gaseous ammonia may be pumped into a body of liquid caustic, or a quantity of liquid ammonia may be added and the pressure maintained at a value such that the liquid ammonia will be absorbed by the caustic. In no case should the concentration of ammonia be maintained at such a concentration that a separation of a liquid phase consisting preponderantly of water and ammonia from a liquid phase consisting preponderantly of caustic and water occurs. The following examples illustrate my invention:

*Example I*

Caustic liquor of a concentration of about 46 percent and containing about 0.85 percent NaCl was treated with 0.5 part of ammonia per part of NaOH at about 125 pounds per square inch pressure. The mixture was cooled to 10° C. at which point rapid crystallization occurred. In order to obtain better crystals, the temperature was raised to about 25° C. so that all but a few crystals were melted. This mixture was then brought to 15° C. and crystallization was allowed to proceed at a slow rate. After completion of crystallization, the crystals were filtered under pressure, the ammonia allowed to flash off and the crystals analyzed with the following results:

|  | Expt. No. 1 | Expt. No. 2 |
| --- | --- | --- |
| Original liquor: | Per cent | Per cent |
| NaOH | 46.09 | 45.5 |
| NaCl | 0.85 | 0.43 |
| Melted crystals: | | |
| NaOH | 49.95 | 49.9 |
| NaCl | 0.35 | 0.15 |

*Example II*

0.5 part by weight of liquid ammonia was mixed with two parts of a 50% solution of sodium hydroxide containing 1.1 percent sodium chloride at 45° C. and the mixture was permitted to cool with stirring to 26° C. The solid thus precipitated was removed from the mother liquor and was found to contain 64 percent sodium hydroxide and only 0.22 percent sodium chloride.

*Example III*

230 parts by weight of liquid ammonia was mixed with 100 parts by weight of a 30 percent solution of sodium hydroxide containing 2 percent NaCl and the mixture cooled to 25° C. whereupon a quantity of solid hydroxide precipitated. Upon recovery the solid contained about 63 percent NaOH and 0.25 percent NaCl.

*Example IV*

170 parts by weight of liquid ammonia was mixed with 100 parts by weight of a solution containing 40 percent NaOH and 2 percent NaCl. The mixture was cooled with agitation to 25° C. and solid precipitated. By recovery of the solid a yield of approximately 90 percent by weight of the sodium hydroxide was obtained. The product contained about 65 percent NaOH and 0.25 percent NaCl.

It is found that an appreciable reduction of the sodium chloride is effected by this process. Best results for the removal of this salt are obtained when the crystals are well-defined, such as those produced by slow crystallization induced, for example, by slow cooling in the presence of seed crystals, or by gradual increase in the ammonia pressure in the presence of seed crystals.

While this process has been described for the most part with relation to sodium hydroxide and its hydrates, the process is equally applicable to the preparation of any of the hydrates of other alkali metal hydroxides, such as those of lithium or potassium hydroxide.

Although the present invention has been described in connection with the specific details of certain embodiments thereof, it is not intended that such details shall be regarded as limitations upon the scope of the invention, except insofar as included in the accompanying claims.

As previously noted, some question exists as to whether the solids precipitated in accordance with my invention are true hydrates, ammoniates or of other composition. By the term "hydrate" in the specification and in the following claims, I mean to include solids containing water and alkali metal hydroxide which precipitate from alkali metal hydroxide solutions upon addition of ammonia regardless of the exact composition of such solids. This application is a continuation-in-part of application Serial No. 179,336, filed December 11, 1937.

I claim:

1. A method of purifying an aqueous solution of an alkali metal hydroxide by precipitating an hydrate thereof comprising preparing an aqueous solution of an alkali metal hydroxide, containing a substantial amount of an alkali metal chloride and having a concentration approximately equal to that of the desired hydrate and treating said solution with a substantial amount of ammonia in concentrations such that a separation of liquid phases does not occur, and maintaining the solution at a temperature such that a quantity of solid hydrate precipitates and separating said hydrate from the solution.

2. A method of purifying an aqueous solution of sodium hydroxide by pricipitating an hydrate thereof comprising preparing an aqueous solution of sodium hydroxide which is substantially saturated with sodium chloride and having a concentration approximately equal to that of the desired hydrate and treating said solution with a substantial quantity of ammonia in concentrations such that a separation of liquid phases does not occur, and maintaining the solution at a temperature such that a quantity of solid hydrate precipitates and separating said hydrate from said solution.

3. A method of purifying an aqueous solution of sodium hydroxide by precipitating sodium hydroxide dihydrate which comprises preparing an aqueous solution of sodium hydroxide containing a substantial quantity of sodium chloride and having a concentration approximately equal to that of the dihydrate and treating said solution with a substantial amount of ammonia in concentrations such that a separation of liquid phases does not occur, and maintaining the solution at a temperature such that a quantity of solid hydrate precipitates.

4. A method of purifying an aqueous solution of sodium hydroxide by precipitating a solidified product from an aqueous solution thereof which comprises treating a solution of sodium hydroxide which is substantially saturated with sodium chloride, having a concentration of substantially about 44 to 50 percent, with a substantial amount of ammonia, the concentration of ammonia being such that a separation of liquid phases does not occur.

5. A method of purifying an aqueous solution of sodium hydroxide by precipitating a solidified product from an aqueous solution thereof which comprises treating a solution of sodium hydroxide which is substantially saturated with sodium chloride, having a concentration of substantially about 44 to 50 percent, with a substantial amount of ammonia at a gradually increasing pressure in the presence of seed crystals, the concentration of ammonia being such that a separation of liquid phases does not occur.

6. The process of purifying sodium hydroxide which comprises treating an aqueous solution of sodium hydroxide containing sodium chloride with a substantial amount of ammonia, the concentration of ammonia being such that a separation of liquid phases does not occur, but sufficient to cause precipitation of a solid hydrate under the temperature of operation, and maintaining the concentration of the remaining solution such that at the end of the precipitation, the solubility of sodium chloride therein is sufficiently high to retain at least the major portion of the total quantity of sodium chloride in the initial solution.

7. A method of precipitating solid hydrates of sodium hydroxide which comprises concentrating an impure solution of sodium hydroxide which is substantially saturated with sodium chloride to approximately 45 to 50 percent, removing precipitated impurities, treating the purified solution to obtain a concentration approximately corresponding to that of the desired hydrate, treating the resultant solution with a substantial amount of ammonia in concentrations such that a separation of liquid phases does not occur, and maintaining the temperature such that a solid hydrate precipitates.

8. A process of purifying an aqueous solution of sodium hydroxide by precipitating the 3½ hydrate thereof which comprises treating an aqueous solution of sodium hydroxide which is substantially saturated with sodium chloride having a concentration approximately equal to that of said hydrate with a substantial amount of ammonia in concentration such that a separation of liquid phases does not occur, and maintaining the temperature of said solution such that a solid hydrate precipitates.

9. A process of purifying an aqueous solution of sodium hydroxide by precipitating the 3½ hydrate thereof which comprises treating an an aqueous solution of sodium hydroxide which is substantially saturated with sodium chloride having a concentration approximately equal to that of said hydrate with a substantial amount of ammonia in concentration such that a separation of liquid phases does not occur, and maintaining the temperature of said solution such that a solid hydrate precipitates.

10. A method of purifying aqueous sodium hydroxide containing substantial quantities of sodium chloride which comprises concentrating said hydroxide while permitting a portion of said sodium chloride to separate out of solution, removing said impurities and treating the purified solution with a substantial amount of ammonia in quantities sufficient to cause precipitation of solid hydrates without appreciable precipitation of sodium chloride, the concentration of ammonia being insufficient to cause a separation of liquid phases and separating solid hydrates from the solution.

11. A method of purifying an aqueous solution of an alkali metal hydroxide containing a substantial quantity of an alkali metal chloride which comprises introducing a substantial amount of ammonia into said solution, maintaining the solution temperature such that a solid hydroxide is precipitated without appreciable precipitation of sodium chloride and separating said solid from a major portion of said solution, the concentration of ammonia introduced into the solution being insufficient to cause a separation of liquid phases.

12. A method of purifying an aqueous solution of sodium hydroxide which is substantially saturated with sodium chloride which comprises introducing a substantial amount of ammonia into said solution, maintaining the solution temperature such that a solid hydroxide is precipitated without appreciable precipitation of sodium chloride and separating the solid from a major portion of said solution, the concentration of ammonia introduced into the solution being insufficient to cause a separation of liquid phases.

13. A method of purifying an aqueous solution of sodium hydroxide by precipitating an hydrate thereof comprising preparing an aqueous solution of sodium hydroxide containing a substantial amount of sodium chloride and having a concentration not substantially less than 39 percent by weight and treating said solution with a substantial quantity of ammonia in concentration such that a separation of liquid phases does not occur, and maintaining the solution at a temperature such that a quantity of solid hydrate precipitates and separating said hydrate from a major portion of said solution.

14. A method of purifying aqueous sodium hydroxide which contains a substantial quantity of an alkali metal chloride which comprises treating the hydroxide with sufficient ammonia and at a temperature sufficiently high to permit separation of a pair of liquid phases and cooling to cause the two liquid phases to merge and formation of solid hydroxide and recovering purified hydroxide from said solid.

15. A method of purifying aqueous sodium hydroxide which contains a substantial quantity of an alkali metal chloride which comprises treating the hydroxide with sufficient ammonia and at a temperature sufficiently high to permit separation of a pair of liquid phases and adding further ammonia to cause the two liquid phases to merge and formation of solid hydroxide and recovering purified hydroxide from said solid.

16. A process of purifying an alkali metal hydroxide solution containing a chloride as an impurity therein which comprises concentrating said solution to 45 to 50 percent, permitting a portion of said impurity to separate out of solution, removing said separated impurity and treating the purified solution with a substantial amount of ammonia in concentrations such that separation of liquid phases does not occur and maintaining the temperature such that a solid hydrate precipitates.

IRVING E. MUSKAT.